(12) United States Patent
An (10) Patent No.: US 7,733,376 B2
(45) Date of Patent: Jun. 8, 2010

(54) REMOTE MONITOR AND CONTROL SYSTEM FOR DRAINING FLOODGATE OF SEAWALL

(75) Inventor: Jong Yul An, Naju-si (KR)

(73) Assignees: Daeyoung Co., Ltd., Naju (KR); Hues Co., Ltd., Gwangju (KR)

(*) Notice: Subject to any disclaimer, the term of this patent is extended or adjusted under 35 U.S.C. 154(b) by 515 days.

(21) Appl. No.: 11/780,668

(22) Filed: Jul. 20, 2007

(65) Prior Publication Data

US 2008/0074498 A1    Mar. 27, 2008

(30) Foreign Application Priority Data

Aug. 9, 2006   (KR) ...................... 10-2006-0075336

(51) Int. Cl.
*H04N 5/225*    (2006.01)
*H04N 9/04*    (2006.01)

(52) U.S. Cl. .................. 348/207.99; 348/143; 348/159; 340/601; 340/602; 340/603; 340/612

(58) Field of Classification Search ................. 348/143, 348/159, 156, 207.99; 340/601–606, 612

See application file for complete search history.

*Primary Examiner*—David L Ometz
*Assistant Examiner*—Antoinette T Spinks
(74) *Attorney, Agent, or Firm*—John K. Park; Park Law Firm (57) ABSTRACT

Disclosed is a remote monitor and control system for draining floodgate of a seawall in that movie and audio signals of a draining floodgate are transmitted to a remote place through a communication network and each device can be remotely controlled in the remote place through two-way communications. The remote monitor and control system for draining floodgate of a seawall according to the present invention includes a spot control means, a control means, and a remote control means.

9 Claims, 9 Drawing Sheets

REMOTE MONITOR AND CONTROL SYSTEM FOR DRAINING FLOODGATE OF SEAWALL

BACKGROUND OF THE INVENTION

1. Field of the Invention

The present invention relates to a remote monitor and control system for draining floodgate of a seawall, and more particularly to a remote monitor and control system for draining floodgate of a seawall in that movie and audio signals of a draining floodgate are transmitted to a remote place through a communication network and each device can be remotely controlled in the remote place through two-way communications.

2. Description of the Prior Art

Generally, in a conventional draining floodgate, the water level or the opening and closing thereof is manually controlled on the spot. Accordingly, in case of emergency, since the manager directly goes to the spot and deals with the emergency situation, it has a difficulty in quickly dealing with the problem. Also, as though the manager goes straight to the spot, since it is necessary to make a close investigation of it, there is a problem in that it can give rise to delay of processing time.

Generally, the draining floodgate mounted on a dam and so on includes an opening and closing device for opening and closing the floodgate and controlling the volume of water kept in store. In the past, the draining floodgate can be manually opened and closed through the rotation of a control handle. Recently, the draining floodgate can be automatically opened and closed by using a motor and gear units or a hydraulic piston system and so on.

However, in case of the conventional automatic manner, since the control panel for driving the motor and so forth is formed at the spot, in order to open and close the draining floodgate, it is necessary to directly operate the switch of the control panel located at the spot. Also, in case of urgent emergency such as a suddenly localized heavy rain or storm, it cannot quickly cope with the situation.

Korean patent registration No. 189321 discloses the remote control system for draining floodgate capable of receiving the opening and closing operation information through a beeper call signal. However, there are problems in that the manager cannot visually check out the present state thereof and the operation of the opening and closing thereof is often time consuming.

More concretely, since the beeper use one-way communications, the manager of the floodgate can control the opening and closing thereof through the control of the motor according to the wireless operation signal thereof. However, the manager of the floodgate cannot check out the present state of the opening and closing. Also, there are problems in that the manager cannot visually check out the present state thereof and the information of the opening and closing thereof should be generated through the key of the phone. Moreover, in case of many floodgates, the opening and closing orders on the entire floodgates must be issued one by one.

Korean patent application No. 1997-0049594 discloses the remote operating system for draining floodgate in that beepers are formed at each floodgate and shortwave communications equipments are formed between relay devices, so that each relay device informs the operator of the present state of each floodgate through telephone calls and the operator operates the floodgate through the operation of the telephone keys. However, it is impossible to control each floodgate in a row and the operation of the opening and closing thereof is often time consuming because it is necessary to send the operation result again after operation thereof.

Korean patent application No. 2001-0047206 discloses the remote monitoring and operating system for draining floodgate using an internal digital circuit modem in that each floodgate is communicated with a remote place through interphones and the transmission of the camera signals and various equipments can be operated through speed data communications. However, it has a difficulty in operating each floodgate owing to weather conditions or external surroundings and so on.

Korean patent application No. 2002-0002137 discloses the method for operating draining floodgate using a computer and the apparatus thereof in that a power generating means, floodgate opening and closing sensors and power supplement portions are formed at each floodgate and the opening and closing rate of each floodgate is displayed on a manage computer monitor, so that each floodgate can be operated according to the opening and closing information of each floodgate. The system can obtain the information on the opening and closing rate and so forth through various sensors. However, it has a difficulty in obtaining the surfaces of the inland water and seawater respectively in detail Also, in the Korean patent application No. 2002-0002137, there are floodgates, electric motors for controlling the floodgates and electric control panels in the spot.

The control panel serves to close, open and stop each floodgate. However, during the operation of a CT measurement device or relay switches, the spark noises or an instant drop of electric pressure can be generated owing to a load and so forth. Accordingly there is a problem in that it can give the CPU, D/I, D/O, A/I, transmitter and so on a mortal damage.

SUMMARY OF THE INVENTION

Accordingly, the present invention has been made to solve the above-mentioned problems occurring in the prior art, and an object of the present invention is to provide a remote monitor and control system for draining floodgate of a seawall in that movie and audio signals of a draining floodgate are transmitted to a remote place through a communication network and each device can be remotely controlled in the remote place through two-way communications.

Another object of the present invention is to provide a remote monitor and control system for draining floodgate of a seawall in that each draining floodgate is remotely monitored and controlled through two-way communications between a computer and system transmitting devices, so that it can quickly cope with the accident thereof.

Further another object of the present invention is to provide a remote monitor and control system for draining floodgate of a seawall capable of decrease the flights in the draining floodgate and maintaining a security of a floodgate opening and closing device.

Further another object of the present invention is to provide a remote monitor and control system for draining floodgate of a seawall in that various relay devices are automatically controlled and the devices are miniaturized, so that it is not influenced by a noise and spark of an electric motor.

Further another object of the present invention is to provide a remote monitor and control system for draining floodgate of a seawall in that a voltage regulator circuit is constructed, so that it can prevent the data loss owing to a drop of electric pressure during driving of the motor and operate stably the device.

To accomplish the objects, the present invention provides a remote monitor and control system for draining floodgate of a seawall comprising: a spot control means comprising monitoring cameras for detecting surfaces of an inland water and a seawater respectively, detecting sensors for detecting opening and closing state, water level, water flux, water pressure, rainfall and so on of the draining floodgate and generating a predetermined electric signal corresponding to a detecting volume, speakers for amplifying audio signals transmitted from a spot control room or a remote control room formed at sides of the inland water surface and seawater surface respectively, floodgate opening and closing devices for transmitting information data having a response information on an operation order, opening and closing state information of the draining floodgate, and water level information of the draining floodgate and controlling the opening and closing of the draining floodgate by means of a power, and spot controllers for detecting the opening and closing state and trouble state of the draining floodgate, transmitting the state signal of the draining floodgate to the integrated controller, receiving the operation order of the draining floodgate from the integrated controller, sending the code signal and data to the data interpreter based on his code signal, and conducting two-way communications between the computer having a fixed IP and monitoring cameras and control units; a control means comprising a data interpreter for interpreting the data received from the spot controller of the spot control means and remote-control the spot control means, an integrated controller for sending the data control signals on the opening and closing, stop and reset of the draining floodgate based on the interpreted data to the spot controller and conducting two-way communications between a computer having the fixed IP of the spot control means and control units, an image remote controller for conducting an internet access function of wire or wireless, a data compression function, a data restoration function, a remote camera control function, a system operation function and so on, and a monitoring device for displaying the images of the monitoring camera of the draining floodgate; and a remote control means comprising a central management server for receiving processing data, displaying the received data information, and transmitting the operation order to the control means, and an alarm call device for automatically informing emergency situations of a spot monitor or a registered user by means of wire or wireless phone in case of emergency.

Preferably, the image remote controller comprises a video card portion for compressing the image signals inputted through the monitoring camera in an MPEG-4 conversion manner, an audio card portion for processing the audio signals and having input/output ports of a mike, amp, and speaker for two-way communications, a digital data output portion for transmitting the result signals processed by a CPU through the control signals of the manager to controlling devices, an analog data output portion for converting digital signals processed by the CPU through the control signals of the manager into analog signals and transmitting them to the controlling devices, an emergency signal processing portion for receiving the emergency signal on an access control and a device malfunction and transmitting the emergency signal and the recorded message to the registered manager, a security power controlling portion for controlling turn-on/off of the power so as to maintain the security of the floodgate opening and closing device, a RGB monitor card portion for monitoring and displaying the image signals received from the video card portion in order, a color order screen outputting portion for outputting the image signals received from the video card portion in order according to 4-16 divisions manner, a data comparing portion for separating the data signals inputted by the remote control means and sending them to the spot controller so as to control the spot controller, a hub for mixing the communication signals inputted by the power controller or the draining floodgate controller and sending them to the remote control means, a MPEG encoding/decoding portion for supporting a MPEG4 480/240F for conducting compressing, restoring, and storing all data of the image remote controller, a CPU 242 for sending and receiving various data among each element of the image remote controller and controlling each element over all, and a Codec portion for sending the data through the remote controller after the encoding of the data in the CPU, receiving the data of the remote control means, and transmitting it to the CPU.

Preferably, the spot controller servers to call out the control room, the remoter control room or the monitor according to the state of the draining floodgate in real-time, Preferably, a camera state, lens state, lamp state, floodgate opening and closing state, and urgent message signals and so on can be inquired and controlled by means of the remote control or network.

Preferably, the data interpreter comprises a data comparator for interpreting the data received from the spot controller and a microcomputer for preventing a data contact between peripheral units and controlling remotely them over all.

Preferably, the integrated controller using a RS-485 communication manner serves to transmit a control data of a pulse width type to the spot controller having a granted code of his specific number.

Preferably, it can have access to the floodgate opening and closing device through an input of a password in order to block up the access to it except the manager.

Preferably, the spot controller comprises a D/O module for controlling the opening and closing, stop and reset of the floodgate opening and closing device according to the control signals of the control means, a D/I module for transmitting the operation state of the floodgate opening and closing device of the draining floodgate by means of non-contacting signals, an A/I module for sending the analog signals such as a voltage, current, opening and closing rate and so on to the CPU of the spot controller, a power supplement portion for supplying the power, a control box for receiving the control signal of the CPU received from the control means and forward or reverse rotating the electric motor according to the control signal on the opening and closing, and stop of the floodgate opening and closing device, a limit switch portion having on/off switches for stopping the draining floodgate during perfectly opening and closing thereof and displaying the flickering state on the direction indicators, a opening and closing rate converting portion for reducing speed according to the rotation power from the central axis of the spot machine and displaying the resistance values from a variable resistor mounted to the spot machine, the direction indicators for displaying the perfectly opening and closing state of the draining floodgate through LED lamps, a display portion for identifying the state by the eye of the user, and the CPU for controlling each element over all electrically connected to each element.

Preferably, the power supplement portion comprises a voltage regulator circuit in order to prevent the data loss owing to a drop of electric pressure during driving of the motor and operate stably the device.

BRIEF DESCRIPTION OF THE DRAWINGS

The above as well as the other objects, features and advantages of the present invention will be more apparent from the following detailed description taken in conjunction with the accompanying drawings, in which.

DETAILED DESCRIPTION OF THE PREFERRED EMBODIMENTS

A preferred embodiment of the invention will be described in detail below with reference to the accompanying drawings.

Figure 1:
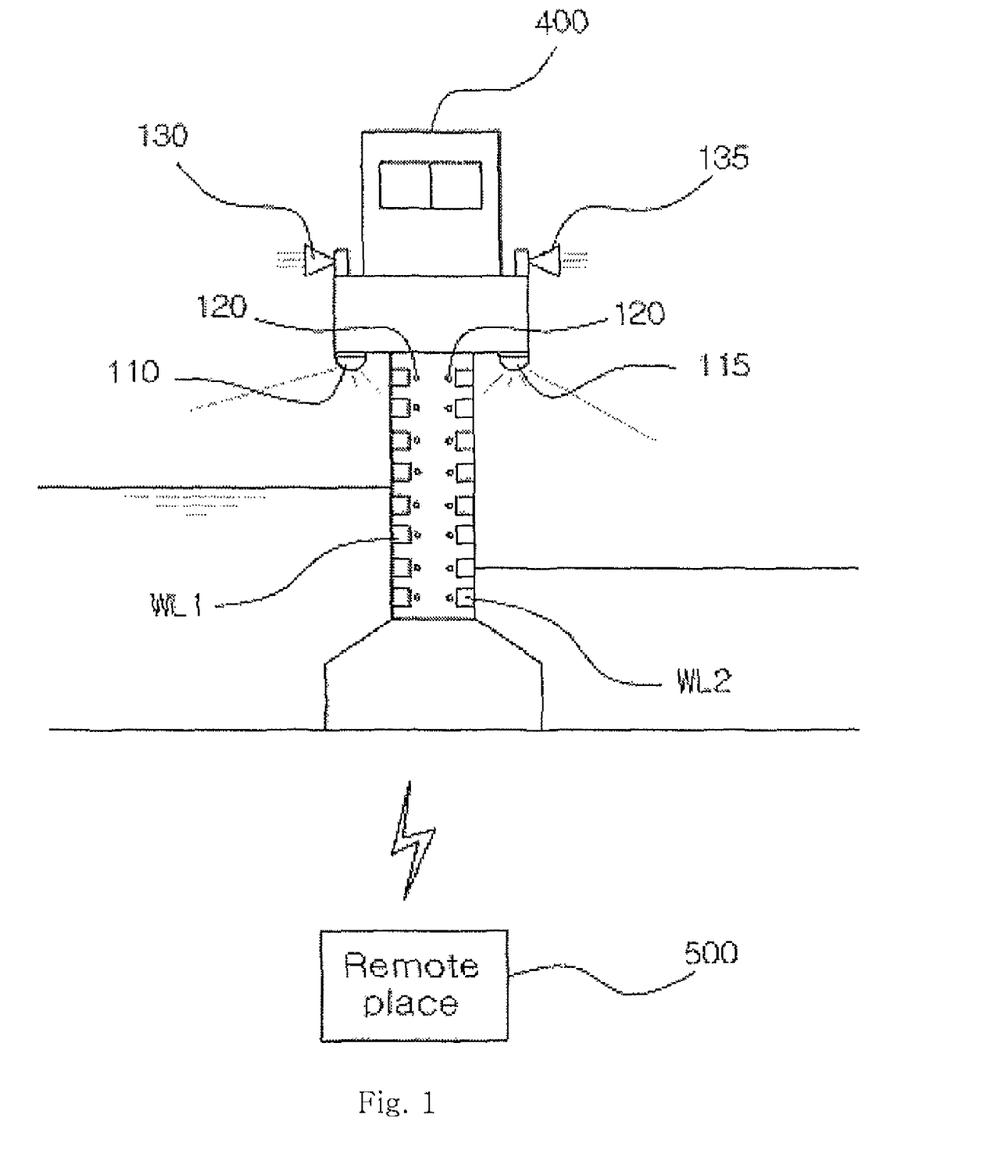
FIG. 1 is an arrangement view illustrating a remote monitor and control system for draining floodgate of a seawall according to the present invention.

FIG. 1 is an arrangement view illustrating a remote monitor and control system for draining floodgate of a seawall according to the present invention.

As shown in FIG. 1, in the remote monitor and control system for draining floodgate of a seawall according to the present invention, each draining floodgate 600 having watermarks WL1 and WL2 of an inland water and a seawater includes first and second monitoring cameras 110 and 115 for detecting the surfaces of the inland water and seawater respectively, speakers 130 and 135 for amplifying the audio signals transmitted from the remote control room 500, and a spot controller 150 having a specific number for inputting control states from a floodgate opening and closing device 140 and transmitting it to an integrated controller 220 of a RS-485 manner. Also, a spot control room 400 provided in the spot 600 for operating the image and audio signals includes an image monitoring and controlling device, a floodgate controller, a broadcasting controller, a power controller, and the integrated controller 220 for interpreting the control status, converting analog signals such as a device state, a spot state, a water level, and facility images into digital signals, and transmitting them to a remote control room 500 through a wire or wireless communication network. The remote control room 500 serves to directly control the control states thereof by means of a control computer having a mike and an audio signal amplifier or monitor and control them through a computer monitor in real-time. Here, it is possible for another computer communicated with the remote control room 500 to control them through an authentication process.

Figure 2:
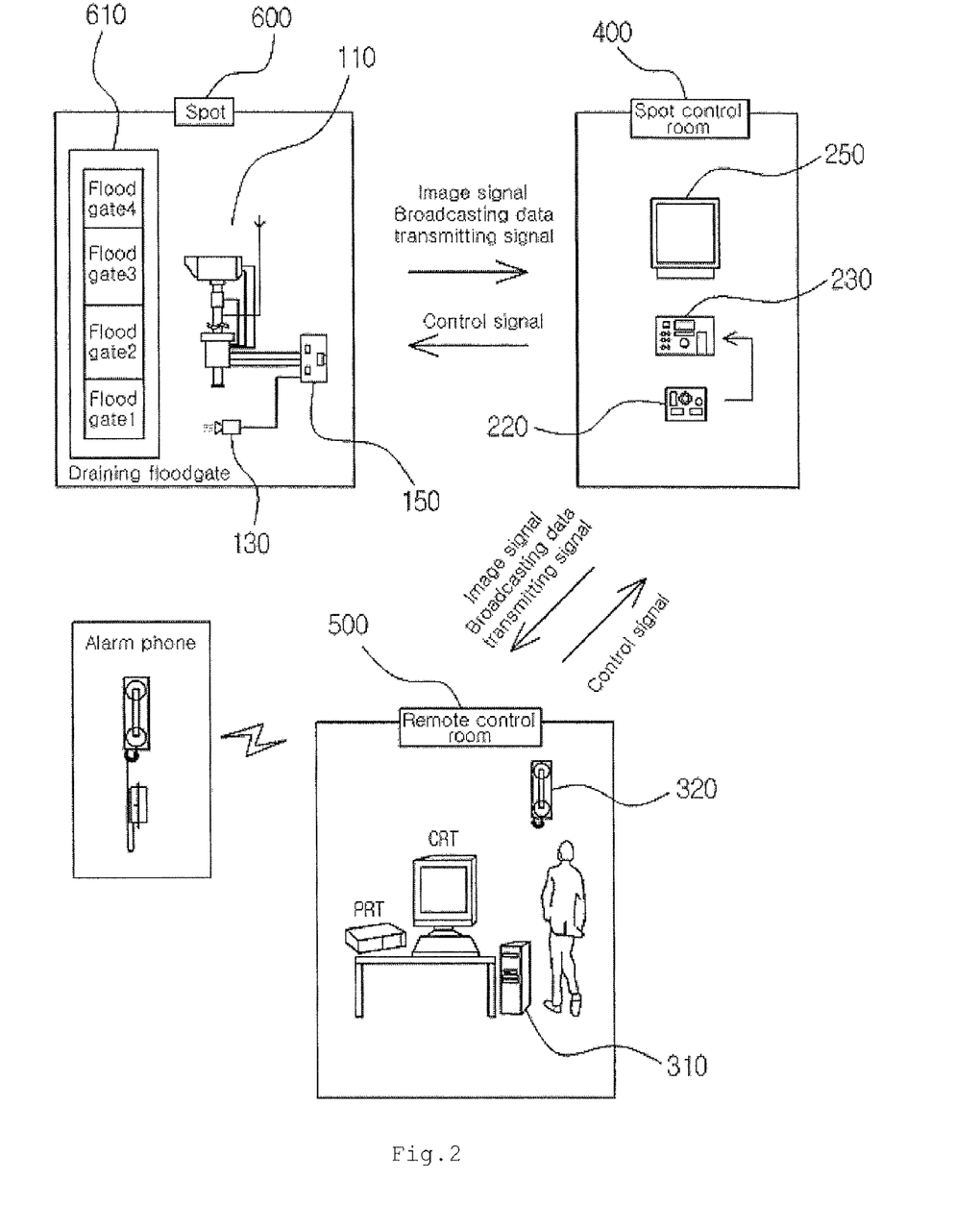
FIG. 2 is a schematic block diagram illustrating the remote monitor and control system for draining floodgate of a seawall according to the present invention.

FIG. 2 is a schematic block diagram illustrating the remote monitor and control system for draining floodgate of a seawall according to the present invention.

As shown in FIG. 2, the remote monitor and control system for draining floodgate of a seawall according to the present invention includes the spot controller 150 using two-way communications and the integrated controller 220 for interpreting and transmitting the control status thereof.

The spot controller 150 servers to detect the opening and closing state of the draining floodgate 610 and the trouble state thereof and control the exact position thereof. Also, the spot controller 150 servers to call out the control room 400 or a monitor according to the state of the draining floodgate 610 and transmit the data to a data interpreter 210 based on his code signals in real-time.

Here, the integrated controller 220 serves to control the data received to the data interpreter 210.

The data interpreter 210 includes a data comparator 211 for interpreting the data received from the spot controller 150 and a microcomputer 212 for preventing a data contact between peripheral units and control remotely them over all. Accordingly, there is a merit in that it has a superior compatibility.

The microcomputer 212 having serves to prevent it from being conflicted with the existed data and has circuits for remote control therein.

As shown in FIG. 2, in the remote monitor and control system for draining floodgate of a seawall according to the present invention, the spot controller 150 and the integrated controller 220 have modules for two-way communications between the computer having a fixed IP and the camera and peripheral units, so that it can inquire and control the camera state, lens state, lamp state, floodgate opening and closing state, and urgent message signals and so on by means of the remote control or network.

Also, in case of emergency, an alarm call is operated on the spot through an alarm signal processor of an image remote controller. In this case, where a monitor 1 is away from the spot, it can call another monitor 2 on the phone.

The integrated controller 220 using the RS-485 communication manner serves to notify the spot controller 150 having a granted code of his specific number by using a low signal as a start bit for preventing the noise through the network and transmit a controlling data of a pulse width type to the spot controller 150. The spot controller 150 is operated according to the control data received from the integrated controller 220. After the operation of the spot controller 150, the spot controller 150 sends his state signal to the integrated controller 220, integrated controller 220 in order to check it through an operating software or a computer monitor, thereby exactly remote-controlling the spot controller 150.

The data interpreter 210 serves to interpret the image signal or control signal received from the integrated controller 220 communicated with the spot controller 150 and then, the integrated controller 220 sends the data control signals on the opening and closing, stop and reset of the draining floodgate 610 to the spot controller 150. Then, the spot controller 150 conducts a feedback on the present location state of the draining floodgate 610.

Figure 3:
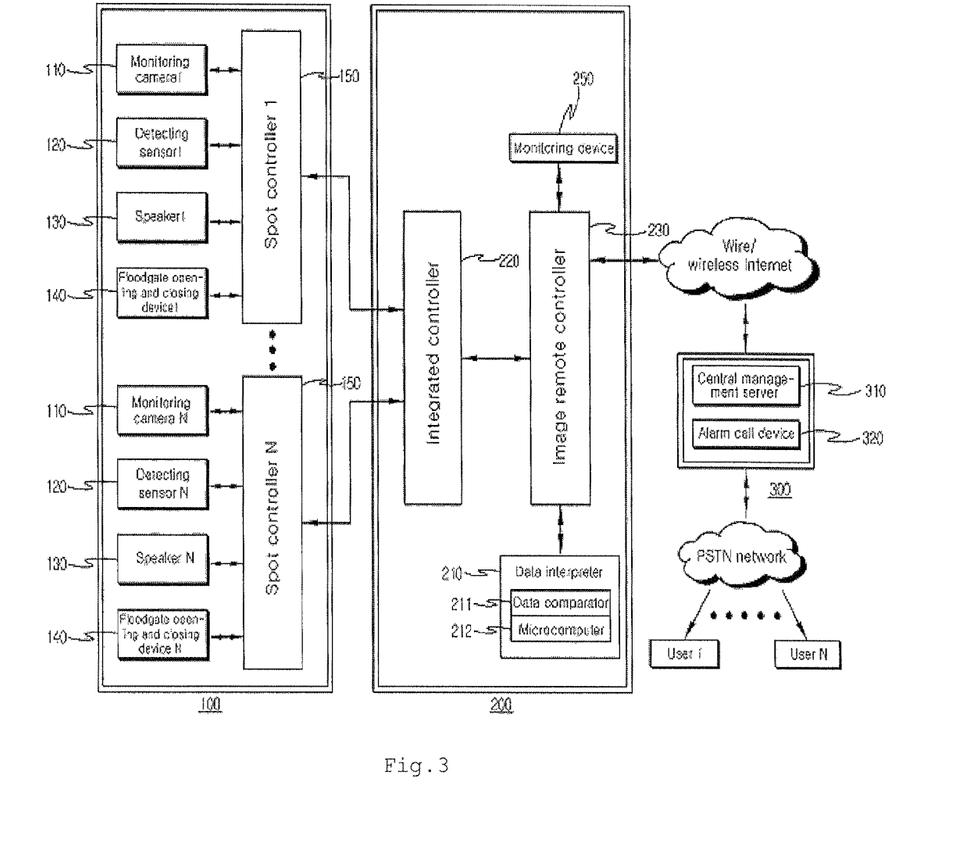
FIG. 3 is an entire block diagram illustrating the remote monitor and control system for draining floodgate of a seawall according to the present invention.

FIG. 3 is an entire block diagram illustrating the remote monitor and control system for draining floodgate of a seawall according to the present invention.

As shown in FIG. 3, the remote monitor and control system for draining floodgate 610 of a seawall according to the present invention includes a spot control means 100, a control means 200, and a remote control means 300.

The spot control means 100 includes first and second monitoring cameras 110 (monitoring cameras 1 and N) for detecting the surfaces of the inland water and seawater respectively, detecting sensors 120 (detecting sensors 1 and N) for detecting the opening and closing state, water level, water flux, water pressure, rainfall and so on of the draining floodgate 610 and generating a predetermined electric signal corresponding to the detecting volume, speakers 130 (speakers 1 and N) and 135 for amplifying the audio signals transmitted from the spot control room 400 or the remote control room 500 formed at the sides of the inland water surface and seawater surface respectively, floodgate opening and closing devices 140 (floodgate opening and closing devices 1 and N) for transmitting information data having a response information on the operation order, opening and closing state information of the draining floodgate 610, and water level information of the draining floodgate 610 and controlling the opening and closing of the draining floodgate 610 by means of a power, and spot controllers 150 (spot controllers 1 and N) for detecting the opening and closing state and trouble state of the draining floodgate 610, transmitting the state signal of the draining floodgate 610 to the integrated controller 220, receiving the operation order of the draining floodgate 610 from the integrated controller 220, sending the code signal and data to the data interpreter 210 based on his code signal, and conducting two-way communications between the computer having a fixed IP and monitoring cameras 110 and control units.

The spot control means 100 can be communicated with the control means 200 by wire or wireless. Also, the spot control means 100 can be communicated with the remote control means 300 by wire or wireless.

The plurality of spot control means 100 are mounted to each draining floodgate 610.

The control means 200 includes the data interpreter 210 for interpreting the data received from the spot controller 150 of the spot control means 100 and remote-control the spot control means 100, the integrated controller 220 for sending the data control signals on the opening and closing, stop and reset of the draining floodgate 610 based on the interpreted data to the spot controller 150 and conducting the two-way communications between the computer having the fixed IP of the spot control means 100 and the remote control means 300 and monitoring cameras 110 and control units, an image remote controller 230 for conducting an internet access function of wire or wireless, a data compression function, a data restoration function, a remote camera control function, a system operation function and so on, and a monitoring device 250 for displaying the images of the monitoring camera 110 of the draining floodgate 610.

The remote control means 300 includes a central management server 310 for receiving processing data, displaying the received data information, and transmitting the operation order to the control means 200, and an alarm call device 320 for automatically informing emergency situations of the spot monitor or the registered user by means of wire or wireless phone in case of emergency.

The spot controller 150 servers to call out the control room 400, the remoter control room 500 or the monitor according to the state of the draining floodgate 610 in real-time, so that so that it can inquire and control the camera state, lens state, lamp state, floodgate opening and closing state, and alarm call and so on in the control room 400 or remoter control room 500.

The floodgate opening and closing devices 140 can use a charging battery as a common power. Also, the floodgate opening and closing devices 140 can use an alternative battery during a common power trouble or a solar cell because of the regional nature.

The data interpreter 210 includes the data comparator 211 for interpreting the data received from the spot controller 150 and the microcomputer 212 for preventing a data contact between peripheral units and control remotely them over all.

Figure 4:
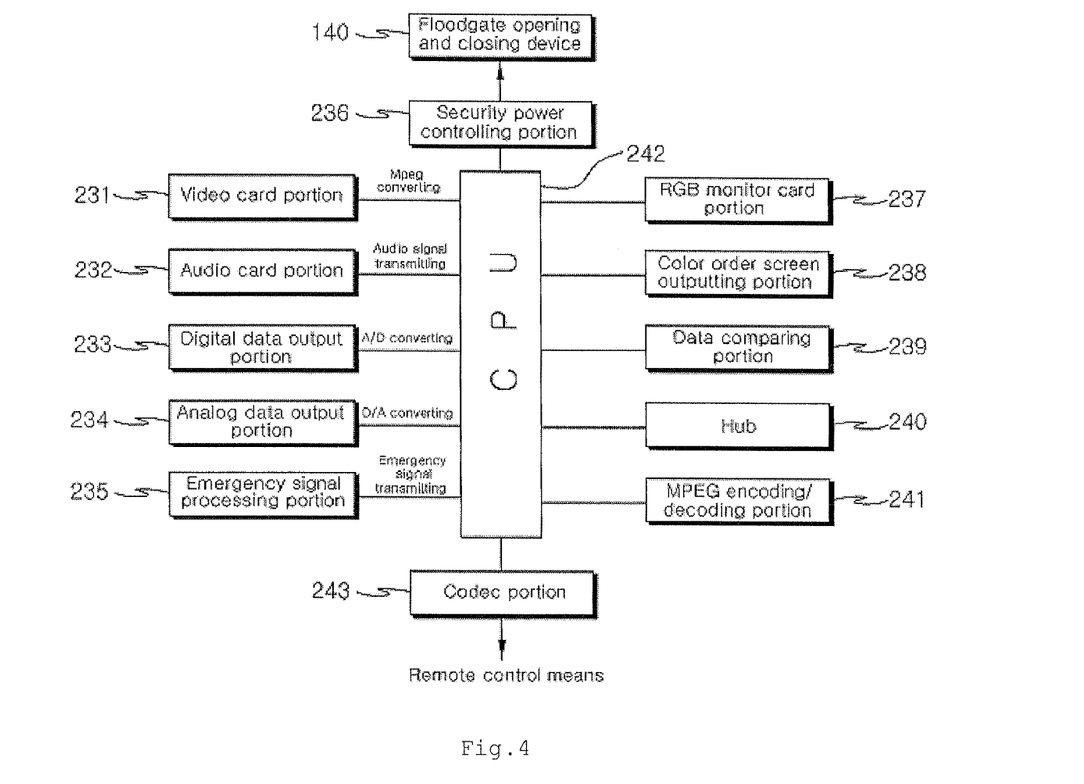
FIG. 4 is a schematic block diagram illustrating the image remote controller of the remote monitor and control system for draining floodgate of a seawall according to the present invention.

FIG. 4 is a schematic block diagram illustrating the image remote controller of the remote monitor and control system for draining floodgate of a seawall according to the present invention.

As shown, the image remote controller 230 includes a video card portion 231 for compressing the image signals inputted through the monitoring camera in an MPEG-4 conversion manner, an audio card portion 232 for processing the audio signals and having input/output ports of a mike, amp, and speaker for two-way communications, a digital data output portion 233 for transmitting the result signals processed by a CPU 242 through the control signals of the manager to the controlling devices, an analog data output portion 234 for converting the digital signals processed by the CPU 242 through the control signals of the manager into the analog signals and transmitting them to the controlling devices, an emergency signal processing portion 235 for receiving the emergency signal on the access control and the device malfunction and transmitting the emergency signal and the recorded message to the registered manager, a security power controlling portion 236 for controlling turn-on/off of the power so as to maintain the security of the floodgate opening and closing device, a RGB monitor card portion 237 for monitoring and displaying the image signals received from the video card portion 231 in order, a color order screen outputting portion 238 for outputting the image signals received from the video card portion 231 in order according to 4-16 divisions manner, a data comparing portion 239 for separating the data signals inputted by the remote control means 300 and sending them to the spot controller 150 so as to control the spot controller 150, a hub 240 for mixing the communication signals inputted by the power controller or the draining floodgate controller and sending them to the remote control means 300, a MPEG encoding/decoding portion 241 for supporting a MPEG4 480/240F for conducting compressing, restoring, and storing all data of the image remote controller 230, a CPU 242 for sending and receiving various data among each element of the image remote controller 230 and controlling each element over all, and a Codec portion 243 for sending the data through the remote controller after the encoding of the data in the CPU 242, receiving the data of the remote control means 300, and transmitting it to the CPU 242.

Generally, the floodgate opening and closing device 140 serves to drive a motor according to the data control signals on the opening and closing, stop and reset and so on of the draining floodgate 610. Here, the security power controlling portion 236 serves to control only the power of the floodgate opening and closing device. That is, it can have access to the floodgate opening and closing device 140 only through the input of a password in order to block up the access to it except the manager. Also, the turn-off thereof can be also, conducted only by means of the input of the password after the completion of the operation thereof. Moreover, if the floodgate opening and closing device is turn-off in the security power controlling portion 236, the floodgate opening and closing device 140 cannot operated.

The image remote controller 230 for encoding the image and audio signals is connected to the codec portion 243, so that the encoded signals are transmitted to the remote control room 500 through the codec portion via the wire or wireless communication network. The codec portion 243 serves to convert the analog audio or image signals into the digital signals or otherwise. Since the codec device is widely well-known, further description is omitted here.

It is preferred that the network connection is conducted on a web through wire or wireless communication network.

As described above, the password is inputted by the user, so that it can prevent fundamentally block up the access to it except the manager. More concretely, during normal times, since the power of the security power controlling portion 236 becomes turn-off, it is impossible to control the floodgate opening and closing device 140. However, only the manager inputs the password, so that the power thereof is turn-on thereby controlling the floodgate opening and closing device 140.

Any computer having a network communication function can perform the above processes, besides the remote control room 500.

To give an example of the remote monitor and control system for draining floodgate of a seawall according to the present invention, if the detecting sensor 120 detects the change of the watermark WL1 of the inland water from 80 M to 85, the detected signal is transmitted to the control means 200 through the hub 240 of the image remote controller 230. Then, when the detected signal is sent to the codec portion 243 through the CPU 242, the screen of the draining floodgate 610 is flickered in the monitoring device 250, or the present screen of the draining floodgate 610 is widely displayed, or the alarm signal bell (not shown) is ringed, so as to inform the manager of the change thereof. Here, the manager can remotely control the monitoring camera 110 through the wire or wireless communication network. That is, the manager sends the screen control signals to the digital data output portion 233 of the image remote controller 230, so that the pan, tilt and zoom signals are transmitted to the monitoring camera 110, thereby controlling it. Also, the RGB monitor card portion 237 monitors the image signals received from the video card portion 231 in order and the color order screen outputting portion 238 allows the image signals received from the video card portion 231 to be displayed through the monitoring device 250.

In the meantime, the image signals received from the video card portion 231 are converted into the digital signals through the MPEG encoding/decoding portion 241 and then, the converted digital signals can be stored in a DVR (Digital Video Recorder) device or a database of the central management server 310 located at the remote place.

In order to exactly check out having the watermark WL1 of the inland water, the pan, tilt and zoom signals are transmitted to the monitoring cameras 110 by the manager, he directly checks out the change of the watermark WL1 of the inland water. At this time, in case of emergency, the manager sends the audio (alarm) signal to the CPU 242. Then, the CPU 242 sends the audio (alarm) signal to the spot through the audio card portion 232, so that the audio message is outputted to a fisherman or tourists and so on through the speaker 130 so as to seek safety in flight. After a predetermined time passes, if a button for opening of the draining floodgate 610 is operated, the CPU 242 sends the operation signal to the integrated controller 220 through the analog data output portion 234 and then, the corresponding spot controller 150 receives the operation signal from the integrated controller 220, thereby opening the draining floodgate 610 by means of the floodgate opening and closing device 140.

Here, since the technique on the control of the driving motor for opening the draining floodgate 610 is widely well-known, further description and drawing thereof are omitted here.

The display order of the monitoring device 250 can be changed according to the taste of the manager through a display programming.

Here, in case of urgent emergency such as a suddenly localized heavy rain or storm, it can cope with the situation through emergency signal processing portion 235 of the image remote controller 230 and the alarm call device 320 can automatically inform the emergency situations of the spot monitor or the registered user by means of wire or wireless phone.

Figure 5:
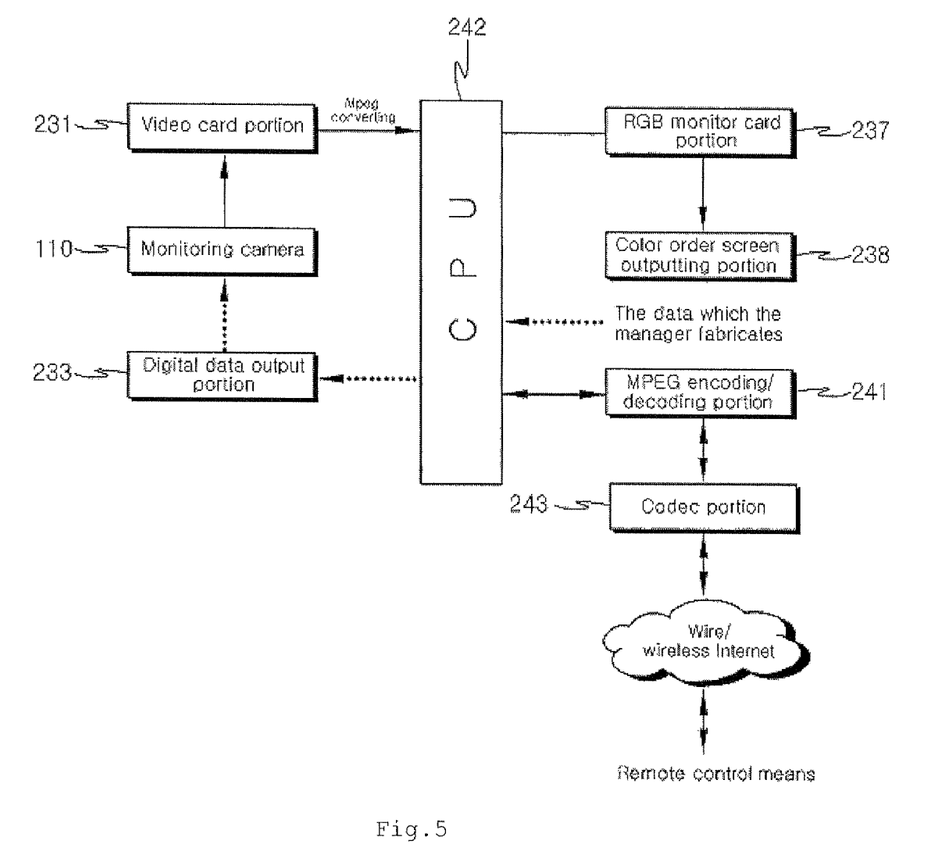
FIG. 5 is a schematic block diagram illustrating the image signal process of the image remote controller of the remote monitor and control system for draining floodgate of a seawall according to the present invention.

FIG. 5 is a schematic block diagram illustrating the image signal process of the image remote controller of the remote monitor and control system for draining floodgate of a seawall according to the present invention.

As shown, the manager generates the operation signals on the pan, tilt and zoom information through the CPU 242 and then, the operation signals are sent to the corresponding monitoring camera 110 through the digital data output portion 233 of the image remote controller 230.

In the meantime, the image signals captured by the monitoring camera 110 are converted into MPEG-4 signals through the video card portion 231 and the MPEG-4 signals are sent to the RGB monitor card portion 237 via the CPU 242. The image signals received through the video card portion 231 are displayed in order through the color order screen outputting portion 238. Here, since the color order screen outputting portion 238 has the function of the 4-16 divisions, the image signals received from at least one place can take a quick look. Also, the image data processed by the CPU 242 is compressed through the MPEG encoding/decoding portion 241 and then, the compressed data is sent to the remote control means 300 or remote place through the Codec portion 243 so as to check out them.

Here, the dotted lines mean the transmission signals and the solid lines mean the reception signals.

Figure 6:
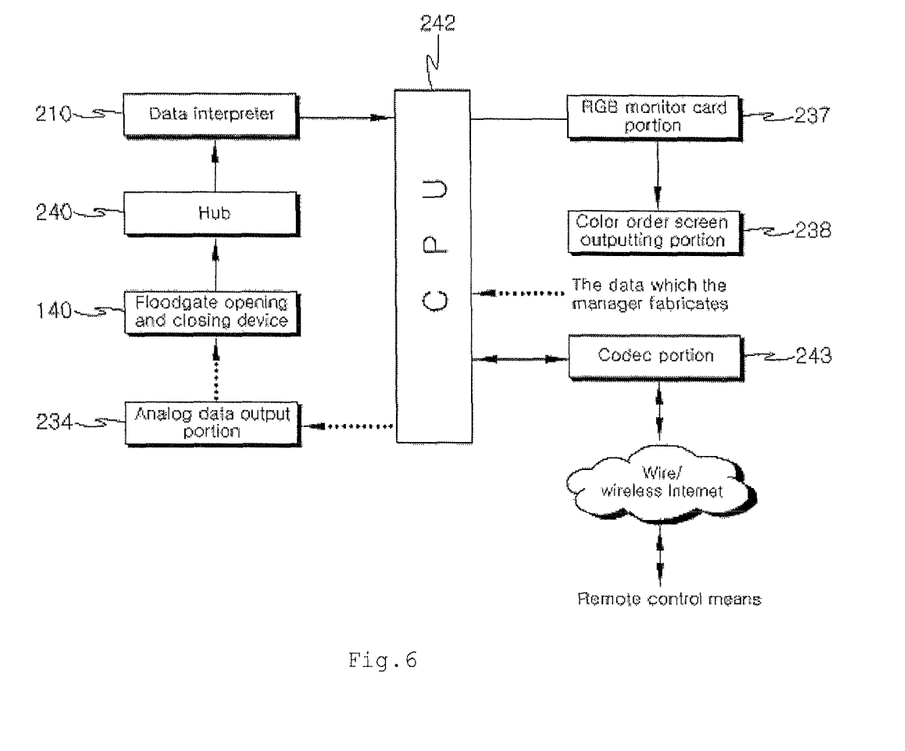
FIG. 6 is a schematic block diagram illustrating the data signal process of the image remote controller of the remote monitor and control system for draining floodgate of a seawall according to the present invention.

FIG. 6 is a schematic block diagram illustrating the data signal process of the image remote controller of the remote monitor and control system for draining floodgate of a seawall according to the present invention.

As shown, the manager generates the operation signals on the opening and closing information of the flood gate through the CPU 242 and then, the operation signals are sent to the corresponding floodgate opening and closing device 140.

In the meantime, when the opening and closing information or present state information and so on of the floodgate opening and closing device 140 are sent to the image remote controller 230, the information is interpreted through the hub 240 and the data interpreter 210. The interpreted data information is sent to the RGB monitor card portion 237 via the CPU 242. The opening and closing information or present state information and so on data are displayed in order through the color order screen outputting portion 238. Here, since the color order screen outputting portion 238 has the function of the 4-16 divisions, the data information received from at least one place can take a quick look. Also, the data information processed by the CPU 242 is compressed through the MPEG encoding/decoding portion 241 and then, the compressed data is sent to the remote control means 300 or remote place through the Codec portion 243 so as to check out them.

Here, the dotted lines mean the transmission signals and the solid lines mean the reception signals.

Figure 7:
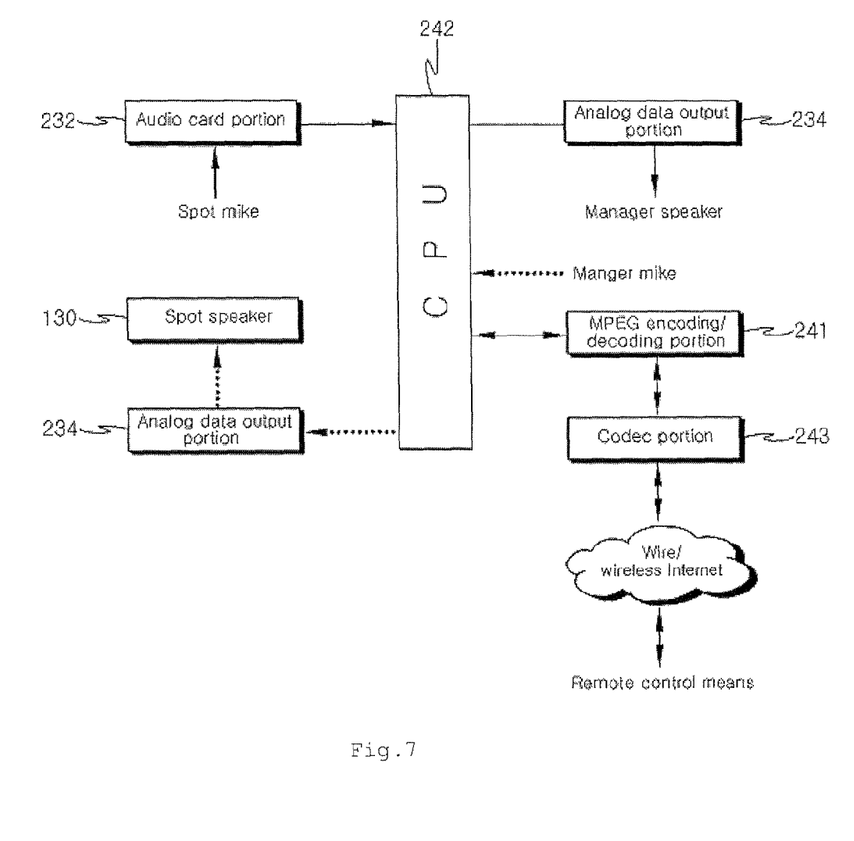
FIG. 7 is a schematic block diagram illustrating the audio signal process of the image remote controller of the remote monitor and control system for draining floodgate of a seawall according to the present invention.

FIG. 7 is a schematic block diagram illustrating the audio signal process of the image remote controller of the remote monitor and control system for draining floodgate of a seawall according to the present invention.

As shown, if the manager input the audio signal through the mike, the audio signal is processed by the CPU 242 and then, the CPU 242 sends the audio (alarm) signal to the corresponding spot speaker 130.

In the meantime, the audio signals inputted through the spot mike (not shown) are sent to the image remote controller 230 located at the remote place or local place to be processed in the CPU 242. Then, the audio signals of the draining floodgate 610 are converted into analog signals through the analog data output portion 234, thereby hearing the sound of the draining floodgate 610 by means of the manager speaker. Also, the audio data processed by the CPU 242 is compressed through the MPEG encoding/decoding portion 241 and then, the compressed data is sent to the remote control means 300 or remote place through the Codec portion 243 so as to check out it.

Here, the dotted lines mean the transmission signals and the solid lines mean the reception signals.

Accordingly, the remote monitor and control system for draining floodgate of a seawall according to the present invention can conduct the two-way communications through the feedback, the data interpreter can prevent the data contact between peripheral units and control remotely them over all, thereby it has a superior compatibility, the alarm call device can automatically inform emergency situations of the spot monitor or the registered user in order to quickly cope with it, and it can have access to the floodgate opening and closing device 140 through the authentication process in order to block up the access to it except the manager.

Figure 8:
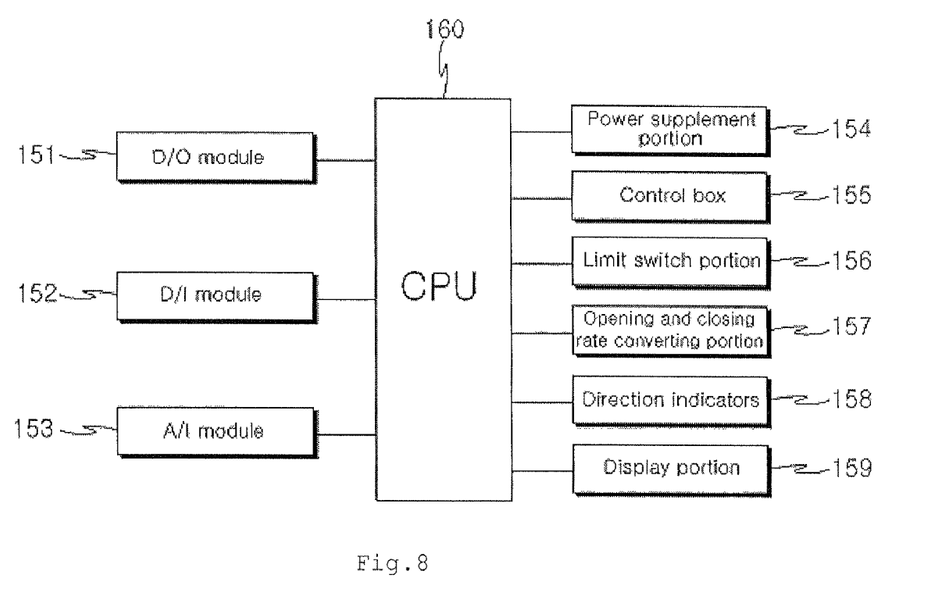
FIG. 8 is a block diagram illustrating the spot controller of the remote monitor and control system for draining floodgate of a seawall according to the present invention.

FIG. 8 is a block diagram illustrating the spot controller of the remote monitor and control system for draining floodgate of a seawall according to the present invention.

Figure 9:
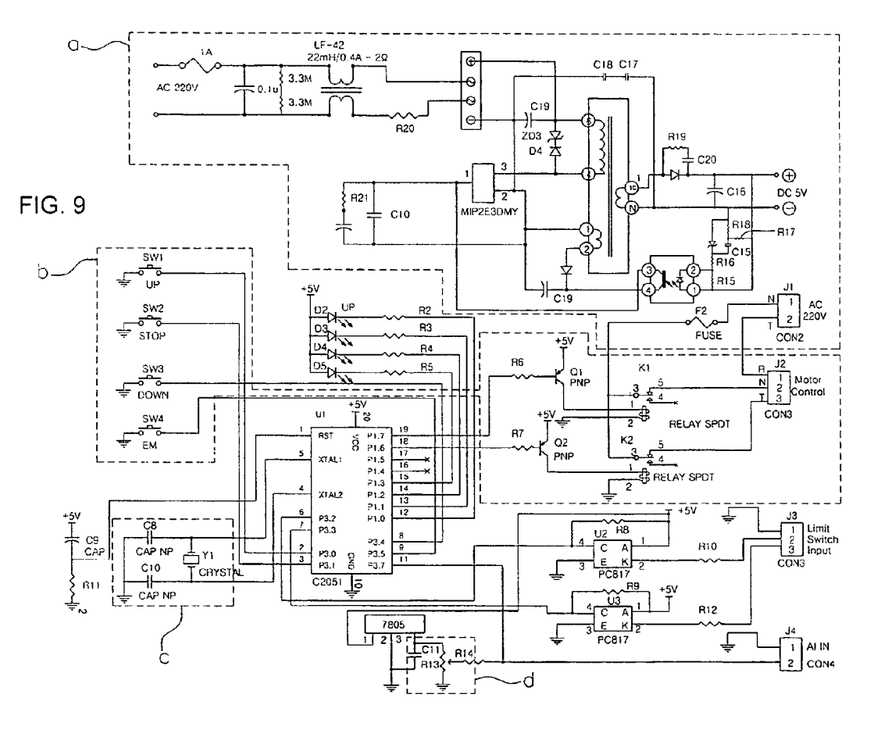
FIG. 9 is a circuit diagram illustrating the spot controller of the remote monitor and control system for draining floodgate of a seawall according to the present invention.

FIG. 9 is a circuit diagram illustrating the spot controller of the remote monitor and control system for draining floodgate of a seawall according to the present invention.

As shown in FIG. 8, the spot controller 150 of the remote monitor and control system for draining floodgate of a seawall according to the present invention includes a D/O module 151 for controlling the opening and closing, stop and reset of the floodgate opening and closing device 140 according to the control signals of the control means 200, a D/I module 152 for transmitting the operation state of the floodgate opening and closing device 140 of the draining floodgate 610 by means of non-contacting signals, an A/I module 153 for sending the analog signals such as a voltage, current, opening and closing rate and so on to the CPU 160 of the spot controller 150, a power supplement portion 154 for supplying the power, a control box 155 for receiving the control signal of the CPU 160 received from the control means 200 and forward or reverse rotating the electric motor according to the control signal on the opening and closing, and stop of the floodgate opening and closing device 140, a limit switch portion 156 having on/off switches for stopping the draining floodgate 610 during perfectly opening and closing thereof and displaying the flickering state on the direction indicators, a opening and closing rate converting portion 157 for reducing speed according to the rotation power from the central axis of the spot machine and displaying the resistance values from a variable resistor mounted to the spot machine, the direction indicators 158 for displaying the perfectly opening and closing state of the draining floodgate 610 through LED lamps, a display portion 159 for identifying the state by the eye of the user, and the CPU 160 for controlling each element over all electrically connected to each element.

The power supplement portion 154 includes a voltage regulator circuit in order to prevent the data loss owing to a drop of electric pressure during driving of the motor and operate stably the device.

The power supplement portion 154 uses a standby power of high efficiency in the input and output ports 220Vac and 5Vdc in order to reduce the hydrocarbon emissions and economize in electric power.

As shown in "a" of FIG. 9, the power input is AC85-264VRMS and the power output is DC +5.5V/1A. Here, the power input is below 0.1 W (AC100V) or below 0.2 W (AC 230V) during no-load.

A MIP2E3DMY such as a power MOSFET is built in a package having three terminals.

The operation thereof is conducted through a fly back converter of a current mode. Here, since it always senses the first current, it is intermittently operated below a predetermined value. Accordingly, because it has a difficulty in stability of the voltage on account of many ripples, it is necessary to connect a separated regulator of low loss (not shown). The power circuit shown in "a" of FIG. 9 is only for standby. However, where it uses a standby operation conversion function of the MIP2E3DMY, the standby power function for energy-saving can be supplemented in power of within 60 W without changing the transformer.

Accordingly, as though power increasing or decreasing is generated during the initial driving of the electric motor, it can stably supply the power.

In the opening and closing rate converting portion 157, the speed thereof is reduced according to the rotation power from the central axis of the spot machine and serves to convert the input voltage of the converter through the resistance values obtained by rotating the mold variable resistor, thereby obtaining 4-20 mA and 1-5V values. Here, a spot control panel (not shown) is mounted on the spot in order to be easily checked out by the user or operator. It is preferred that the opening and closing rate is displayed on the LED panel and transmitted to the remote control room through the network communication.

In order to control on the spot, the entire operation thereof is on and off through the LED and each operation button becomes smaller.

That is, in the spot control panel, the present state of the draining floodgate 610 is displayed through the LED or display portion.

Since the manager or operator cannot operate all of the draining floodgates 610 located at a long distance (several KM to several tens KM), the opening and closing, stop and reset of the draining floodgate can be remotely controlled according to the control signals of the remote control room.

The spot controller 150 of the remote monitor and control system for draining floodgate of a seawall according to the present invention includes the CPU 160 for receiving the control signals of the remoter controlling room and forward or reverse rotating the electric motor according to the control signal on the opening and closing, and stop of the floodgate opening and closing device 140.

Also, the limit switch portion 156 having on/off switches for stopping the draining floodgate 610 during perfectly opening and closing thereof and displaying the flickering state on the direction indicators allows the switch contact state to be displayed on the LED in the spot controller 150 and transmit it to the remote control room through the D/I module.

Also, preferably, in the spot controller 150, the operation state thereof such as the current, opening and closing rate, limit and so on are displayed through the LED range or digital indicator.

As shown in "a" of FIG. 9, it can substitute a plurality of slot for a plurality of the draining floodgates 610, so that it can decrease the manufacturing cost.

Also, the power supplement portion 154 uses the voltage regulator circuit, so that it can prevent the data loss owing to the drop of electric pressure during driving of the motor and operate stably the device.

As shown in "b" of FIG. 9, the D/O module 151 serves to receive the control signals such as the opening and closing, stop and reset of the draining floodgates 610 of the remote control room and transmit them to the CPU 160, thereby setting the control points.

The control box 155 serves to receive the control signal of the CPU 160 received from the control means 200 and forward or reverse rotate the electric motor according to the control signal on the opening and closing, and stop of the floodgate opening and closing device 140 by driving magnetic switches.

As shown in "c" of FIG. 9, it can synchronize the spot controller of the remote monitor and control system.

The CPU can conduct the self-sustaining function. That is, if the user presses the up/down/stop switches, it can supply the voltage to the controller in succession.

The limit switch portion 156 serves to control the opening/closing height of the draining floodgate 610 according to setting height thereof. For example, where the opening state thereof exceeds the setting value, the measured data value is transmitted to the remote control room, so that the user can check out it.

While this invention has been described in connection with what are presently considered to be the most practical and preferred embodiments, it is to be understood that the invention is not limited to the disclosed embodiments and the drawings, but, on the contrary, it is intended to cover various modifications and variations within the spirit and scope of the appended claims.

As can be seen from the foregoing, in the remote monitor and control system for draining floodgate of a seawall, the movie and audio signals of the draining floodgate can be transmitted to a remote place through a communication network and each device can be remotely controlled in the remote place through two-way communications. Also, each draining floodgate is remotely monitored and controlled through two-way communications between a computer and system transmitting devices, so that it can quickly cope with the accident thereof. Moreover, it can decrease the flights in the draining floodgate and maintain the security of the floodgate opening and closing device.

Furthermore, various relay devices are automatically controlled and the devices are miniaturized, so that it is not influenced by a noise and spark of an electric motor. Also, the voltage regulator circuit is constructed, so that it can prevent the data loss owing to the drop of electric pressure during driving of the motor and operate stably the device.

What is claimed is:

1. A remote monitor and control system for draining floodgate of a seawall comprising:

a spot control means comprising monitoring cameras that detects surfaces of inland water and a seawater respectively, detecting sensors that detects opening and closing state, water level, water flux, water pressure, rainfall of the draining floodgate and generating a predetermined electric signal corresponding to a detecting volume, speakers that amplifies audio signals transmitted from a spot control room or a remote control room formed at sides of the inland water surface and seawater surface respectively, floodgate opening and closing devices that transmits information data having a response information on an operation order, opening and closing state information of the draining floodgate, and water level information of the draining floodgate and controlling the opening and closing of the draining floodgate by means of a power supply, and spot controllers that detects the opening and closing state and trouble state of the draining floodgate, transmits the state signal of the draining floodgate to the integrated controller, receives the operation order of the draining floodgate from the integrated controller, sends the code signal and data to the data interpreter based on the code signal, and conducts two-way communications between a computer having a fixed IP and monitoring cameras and control units;

a control means comprising a data interpreter that interprets the data received from the spot controller of the spot control means and remote-controls the spot control means, an integrated controller that sends the data control signals on the opening and closing, stop and reset of the draining floodgate based on the interpreted data to the spot controller and conducts two-way communications between a computer having the fixed IP of the spot control means and control units, an image remote controller that conducts a wire or wireless internet access function, a data compression function, a data restoration function, a remote camera control function, a system operation function, and a monitoring device that displays the images of the monitoring camera of the draining floodgate; and a remote control means comprising a central management server that receives processing data, displays the received data information, and transmits the operation order to the control means, and an alarm call device that automatically informs a spot monitor or a registered user by means of wire or wireless phone in case of emergency.

2. A remote monitor and control system for draining floodgate of a seawall as claimed in claim 1, wherein the image remote controller comprises a video card portion that compresses the image signals inputted through the monitoring camera in an MPEG-4 conversion manner, an audio card portion that processes the audio signals and having input/output ports of a mike, amp, and speaker for two-way communications, a digital data output portion that transmits result signals processed by a CPU through the control signals of the central management server to controlling devices, an analog data output portion that converts digital signals processed by the CPU through the control signals of the central management server into analog signals and transmits them to the controlling devices, an emergency signal processing portion that receives the emergency signal on an access control and transmits the emergency signal and a recorded message to the registered manager, a security power controlling portion that controls turning-on/off of the power so as to maintain the security of the floodgate opening and closing device, a RGB monitor card portion that monitors and displays the image signals received from the video card portion in order, a color order screen outputting portion that outputs the image signals received from the video card portion in order, a data comparing portion that separates the data signals inputted by the remote control means and sends them to the spot controller so as to control the spot controller, a hub that mixes the communication signals inputted by the power controller or the draining floodgate controller and sends them to the remote control means, a MPEG encoding/decoding portion a MPEG4 480/240F for conducting compressing, restoring, and storing all data of the image remote controller, a CPU 242 that sends and receives various data among each element of the image remote controller and controls each element over all, and a Codec portion sends the data through the remote controller after the encoding of the data in the CPU, receives the data of the remote control means, and transmits it to the CPU.

3. A remote monitor and control system for draining floodgate of a seawall as claimed in claim 1, wherein the spot controller serves to call out to the control room, the remote control room or the spot monitor according to the state of the draining floodgate in real-time.

4. A remote monitor and control system for draining floodgate of a seawall as claimed in claim 1, wherein a camera state, lens state, lamp state, floodgate opening and closing state, and urgent message signals can be inquired and controlled by means of the remote control or a network.

5. A remote monitor and control system for draining floodgate of a seawall as claimed in claim 1, wherein the data interpreter comprises a data comparator for interpreting the data received from the spot controller and a microcomputer for preventing a data contact between peripheral units and remotely controlling them over all.

6. A remote monitor and control system for draining floodgate of a seawall as claimed in claim 1, wherein the integrated controller using a RS-485 communication manner serves to transmit a control data of a pulse width type to the spot controller having a granted code of his specific number.

7. A remote monitor and control system for draining floodgate of a seawall as claimed in claim 1, wherein it can have access to the floodgate opening and closing device through an input of a password in order to block up the access to it except a manager or registered user.

8. A remote monitor and control system for draining floodgate of a seawall as claimed in claim 1, wherein the spot controller comprises a D/O module for controlling the opening and closing, stop and reset of the floodgate opening and closing device according to the control signals of the control means, a D/I module for transmitting the operation state of the floodgate opening and closing device of the draining floodgate by means of non-contacting signals, an A/I module for sending the analog signals such as a voltage, current, opening and closing rate to the CPU of the spot controller, a power supplement portion for supplying the power, a control box for receiving the control signal of a CPU received from the control means and forward or reverse rotating an electric motor according to the control signal on the opening and closing, and stop of the floodgate opening and closing device, a limit switch portion having on/off switches for stopping the draining floodgate during perfectly opening and closing thereof and displaying the flickering state on direction indicators, an opening and closing rate converting portion for reducing speed according to rotation power from the central axis of the spot machine and displaying resistance values from a variable resistor mounted to the spot machine, the direction indicators for displaying the perfectly opening and closing state of the draining floodgate through LED lamps, a display portion for identifying the state by the eye of the user, and the CPU for controlling each element over all electrically connected to each element.

9. A remote monitor and control system for draining floodgate of a seawall as claimed in claim 8, wherein the power supplement portion comprises a voltage regulator circuit in order to prevent the data loss owing to a drop of electric pressure during driving of a motor and stably operate the device.

\* \* \* \* \*